A. H. MAÎTRE AND V. H. G. MARTIN.
ELECTROMAGNETICALLY OPERATED MUSICAL INSTRUMENT.
APPLICATION FILED MAR. 27, 1914.

1,323,198.

Patented Nov. 25, 1919.
5 SHEETS—SHEET 1.

INVENTORS
ALCIDE HECTOR MAÎTRE
VICTOR HENRI GASTON MARTIN
BY
ATTORNEYS

UNITED STATES PATENT OFFICE.

ALCIDE HECTOR MAÎTRE AND VICTOR HENRI GASTON MARTIN, OF ROUEN, FRANCE.

ELECTROMAGNETICALLY-OPERATED MUSICAL INSTRUMENT.

1,323,198.   Specification of Letters Patent.   Patented Nov. 25, 1919.

Application filed March 27, 1914. Serial No. 827,654.

*To all whom it may concern:*

Be it known that we, ALCIDE HECTOR MAÎTRE and VICTOR HENRI GASTON MARTIN, citizens of the Republic of France, and residents of 42 Rue Damiette, Rouen, France, have invented new useful Improvements in Electromagnetically-Operated Musical Instruments, of which the following is a specification.

The present invention relates to keyboard musical instruments in which each sounding element is vibrated by an electromagnet having associated therewith two contact pieces which produce in the electromagnet pulsations of current of the same frequency as the vibrations of the sound-producing body. The special object of the invention is to modify the vibration of the sounding body in such manner as to introduce greater expression in the execution of a piece of music.

The invention is especially characterized by the provision of means to disturb the normal vibration of each sounding body without lessening the preponderance of its fundamental tone over its harmonics, and, at the same time, without diminishing the resonance of the sounding body and consequently without deadening the latter and without introducing the sound of a foreign body to change the nature of the tone produced. This means consists in modifying the vibrations of the sounding body at short intervals—several times per second—without rendering the notes false by causing harmonics due to the rapid succession of these repeated interruptions. The invention contemplates the combined use of the aforesaid means.

The arrangement comprises for each note the combination of a sounding body, an electric circuit for energizing an electromagnet which sets the sounding body in motion, a pair of contacts arranged under the corresponding key in order to control the electromagnet circuit, another pair of contacts (49, 49$^d$, Figure 5$^a$) producing pulsations of current of the same frequency as the vibration of the sounding body, a fret comprising a hard body with soft face fixed at a predetermined distance from the sounding body in such manner as to be struck by the latter when the same is widely vibrated, and an electric pulsator connected in a portion of the circuit which is common to all of the notes or a portion of the notes of the instrument, this latter pulsator having a frequency different from that of the harmonic vibrations of the sounding bodies of the instrument.

In the accompanying drawings,

Fig. 5$^a$ is a diagrammatic section of the complete organization of the instrument;

The means employed to produce pulsations of current of the same frequency as that of the vibration of a corresponding string may be of any suitable known character; for example, a rotary contact block having a series of conductive and non-conductive surfaces and rotating at a suitable speed, or an interrupter contact for electromagnetically vibrated devices in which one of the two contact pieces is arranged to follow the oscillation of a vibratory body so as to become self-exciting. As an example, we have illustrated in the drawings a contact of the latter type such as is described in our Patents 1,106,230 and 1,190,244. This arrangement is shown in Fig. 5$^a$ which also discloses a complete arrangement embodying the present invention. The contact piece 49 is riveted to the spring 49$^a$ connected to the string A by an arm 49$^b$ and a non-conducting tie 49$^c$ which subjects the contact 49 to the vibrations of the string. The second contact piece 49$^d$ is carried by a bell crank 49$^e$ pivoted on the axis 49$^f$. It is pressed against the contact 49 by the return spring 49$^g$ in order to maintain the contact closed. When the key 44 is depressed, the electric current passes through the electromagnet 49$^h$ which attracts one arm of the bell crank 49$^e$ and causes a rupture of the connection between the contacts 49 and 49$^d$. This permits the vibration of the string A by the electromagnet E. As soon as the string A is vibrated, it in turn cause ruptures of the circuit at the contacts 49 and 49$^d$, which ruptures are of the same frequency as the normal vibration of the string which continues to be self-exciting. When the string vibrates and all is well regulated and adjusted, the contact 49$^d$ remains practically motionless and substantially unaffected by the elctromagnet 49$^h$.

Figure 1:
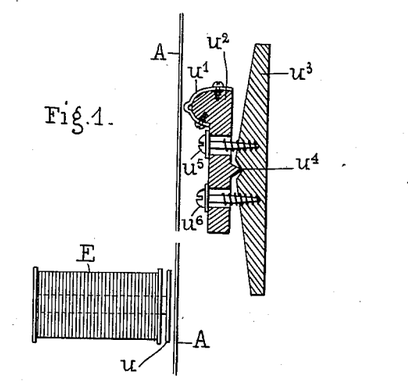
Fig. 1 shows a fragment of a string and a sectional view of the fret $u^2$ and its adjuncts, the electro-magnet E being shown in elevation.

The device shown in Figs. 1 and 5$^a$ is intended to increase the brilliancy and intensity of the sounds by means of repeated shocks. This device consists of a soft body, such as a piece of flannel $u$, placed against the electromagnets E between the latter and the string A. For the low notes there is added a second shock device formed by a soft body $u'$, such as felt, carried by a hard body $u^2$, such as wood, and placed on the opposite side of the electromagnets with relation to the string A at a point which corresponds to a simple fraction of the length of the string and preferably at a point one quarter the length of the string, starting from the end opposite that at which the electromagnets E are arranged. The piece of wood $u^2$ rests upon a fixed member $u^3$ by means of a blade $u^4$ and can be adjusted in position by means of screws $u^5$ $u^6$. In repose, as shown in Fig. 1, the wire A does not touch the felt body $u$, but when it vibrates throughout its length in full amplitude under the influence of the electromagnet E, it strikes against the felt $u'$, and the blows thus produced give greater brilliancy and intensity to the sound emitted.

Figure 2:
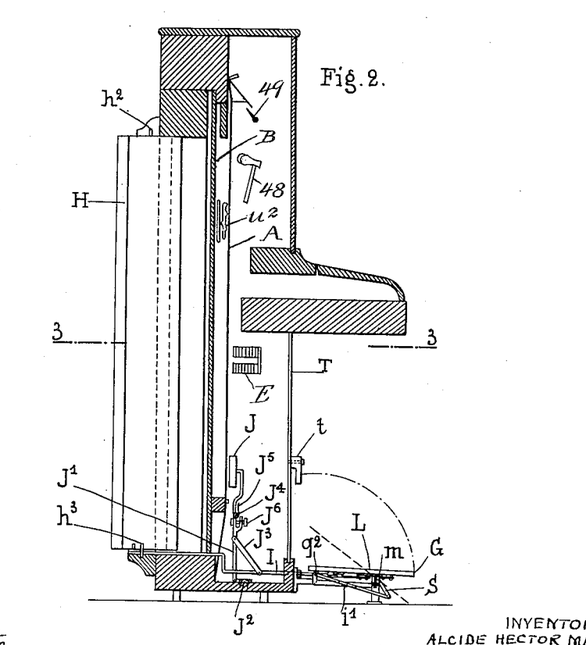
Fig. 2 is a transverse section of the instrument on the line 2—2, Fig. 3, seen from the left.
Figure 3:
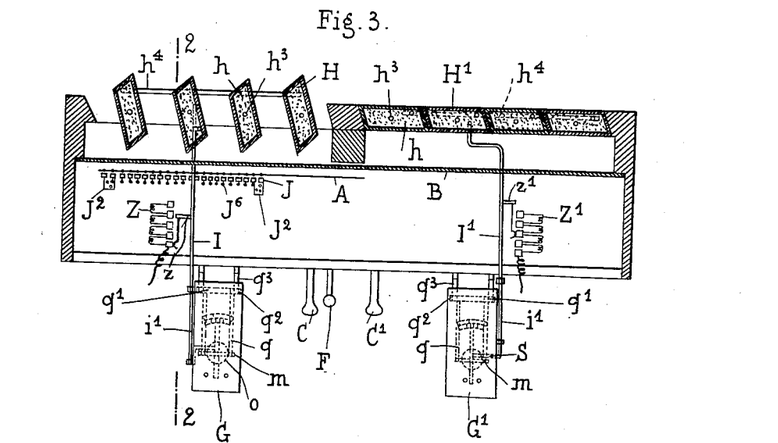
Fig. 3 is a horizontal section on line 3—3, Fig. 2.

In Figs. 2 and 3, A is a piano string, 49 its individual interrupter contact, E the electromagnet which actuates the string, $u^2$ is the fret similar to that of Fig. 1, 48 is the hammer, B is the sounding board, and C and C' the ordinary piano pedals, C being the soft pedal and C' the loud pedal. F is the sustaining pedal which maintains in vibration the notes which it is desired to sound after the fingers have left the corresponding keys of the manual. G and G' are the pedals controlling both the tones and the effects. H and H' are pivoted swell boards or shutters respectively for each half of the key board. J is a system of dampers which can be made to press upon the low strings while they are in vibration in order to decrease the intensity of the sound which they emit.

The dampers J are carried by a board J' (Fig. 2) mounted on hinges J$^2$ and connected to the rod I by the jointed link J$^3$. Each damper is pivoted to the support J' at J$^4$ and provided with a return spring J$^5$ and an adjusting screw J$^6$.

The swell boards H and H', mounted on two pivots $h^2$, $h^3$, are filled in with sound-absorbing material, such as sawdust $h$; their side faces are covered with felt to insure silent working. The swells H and H' form two groups, each controlling one-half of the keyboard. Each group is operated by a pedal G or G' by means of the connecting rods I or I'. A link $h^4$ connects up the shutters of each group to move together.

Figure 4:
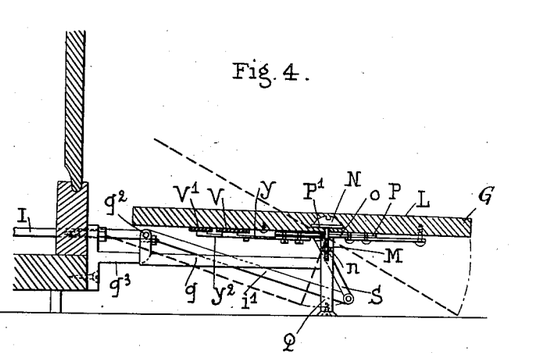
Fig. 4 is an axial section of the pedal controlling various tone effects, taken on the line 4—4, Fig. 5.
Figure 5:
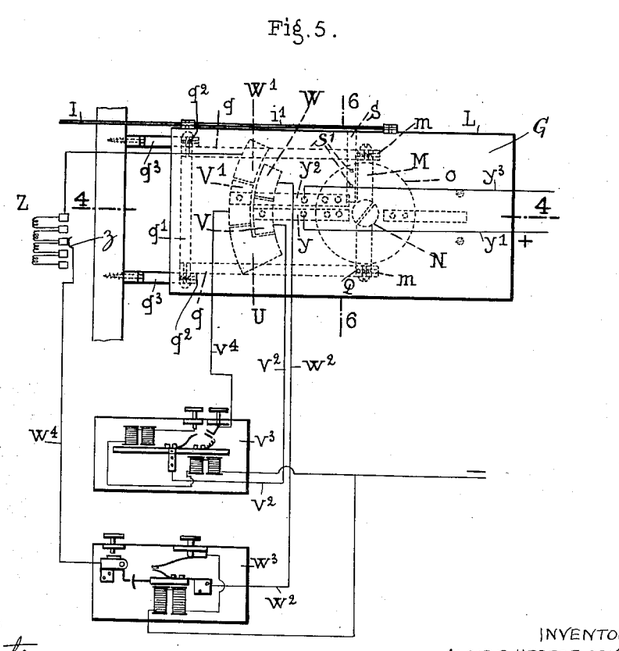
Fig. 5 is a plan view of this pedal and of the distributing contact breakers which it controls.
Figure 5A:
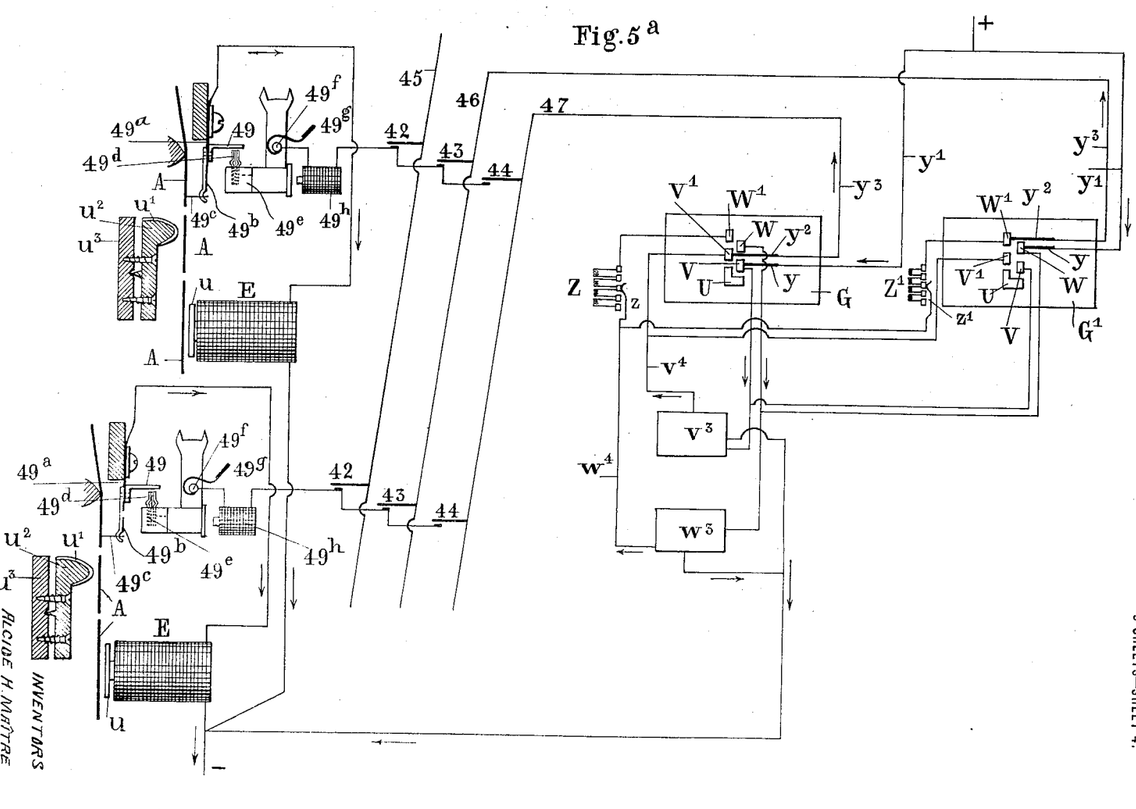
Figures 6, 7:
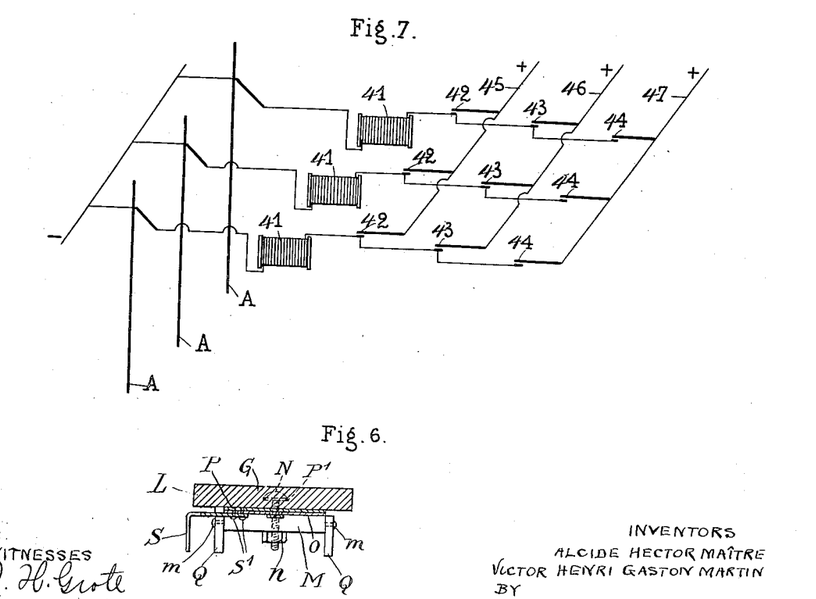
Fig. 6 is a section on the line 6—6, Fig. 5, viewed from the left.
Fig. 7 is a diagram of the connections for a piano organ with two manuals and a pedal keyboard.

Figs. 4, 5, and 6 represent the pedal G in the lowered position. This pedal consists of a board L, capable of oscillating around the horizontal shaft M journaled in bearings $m$, and of turning in its own plane around the vertical bolt N. The latter is screwed into the horizontal shaft M and locked by a backnut $n$; two leather washers P and P' contribute to this locking action.

The bearings $m$ are carried by the two vertical arms Q of a frame Q, $q$, $q'$, which rests on the ground through the arms Q, the cross-piece $q'$ being pivoted at $q^2$ in supports $q^3$ fixed to the piano.

Under the metal plate $o$, which is riveted on the spindle M, is riveted at S' the crank arm S which is connected to the rods I and $i'$. When the pedal is pressed down, the plate $o$ following the same movement, the rod I opens the swell box H, disengages the dampers J from the strings, and operates the rheostat Z, as will be explained hereafter.

The meeting ends of the connecting rods I, $i'$ terminate substantially in the horizontal plane of the axis $q^2$ when the pedal is depressed; the latter may then be lifted against the panel T of the piano and fixed there by a catch $t$ to facilitate the transport of the instrument (see Fig. 2). Under the board L are fixed five contact blocks U, V, W, V', W' (Figs. 4, 5, and 5$^a$); upon the three first there presses successively, when the board L turns around N, a spring contact piece $y$ connected to the source of electrical energy by a lead $y'$ and fixed to the plate O, from which it is electrically insulated; upon the three blocks U, V', W' there presses a second spring contact piece $y^2$ which in practice will be suitably connected to the electromagnets of the second half of the piano by the lead $y^3$, said contact piece $y^2$ being fixed to the plate $o$, from which it is electrically insulated. When the block U is brought on to the contact $y$ by the rotation of the board L, the contact $y^2$ also bears upon the piece U; the normal current is conducted to the left half of the piano through $y$, U, $y^2$, $y^3$.

If the contact $y$ is on the block V, as indicated in Figs. 5 and 5$^a$, the contact $y^2$ is on the block V'; the current passes by $y$, V, $v^2$, to the tremolo distributer $v^3$, returns to the pedal by the wire $v^4$, the block V', and reaches the electromagnets on the left half of the piano by the contact $y^2$ and the wire $y^3$. If the contact $y$ is on the block W, the contact $y^2$ is on the block W' and the current passes through $y$, W, and wire $w^2$ into the murmuring distributer W$^3$. It returns to the pedal by the wire W$^4$, the rheostat Z, the block W', and reaches the electromagnets on the left half of the piano by contact $y^2$ and wire $y^3$. The pedal G, therefore, by its rotation, regulates the nature of the current sent to the left half of the piano. The pedal G', by means of the two distributers similar to $v^3$ and $w^3$, acts in the same way for the right half of the instrument.

Lastly, in the wire $w^4$ of each half of the piano there is interposed a rheostat Z or Z' specially for the murmuring effect. This rheostat is operated by the rod I or I' by means of a spring contact $z$ or $z'$ (Figs. 3, 5, and 5$^a$) bearing upon the blocks. The arrangement of the parts just described is such that the rheostat attains its maximum resistance when the swell boxes are beginning to close and maintains it while they remain closed.

In more expensive instruments, it is of advantage to avoid the division of the keyboard into two parts and to add a second keyboard to vary the effects at will through the whole range of the instrument. It is likewise advantageous to add a pedal keyboard for producing deep tone effects by means of the feet.

Fig. 7 represents diagrammatically the connections for an arrangement of this kind with two manuals and a pedal board. A is the piano string, E the electromagnet which actuates it, 42 is a contact placed under each key of the manual to actuate the dampers and hammers of the piano, 43 is a contact placed under each key of the supplementary manual which does not operate the hammers but only the dampers, while 44 is a contact placed under each lever of the pedal keyboard.

One pole of each contact 42, 43, 44 is connected by a common lead 45, 46, and 47 to the same pole, for example, the positive pole of the source of current. It suffices, therefore, to have as many pedals G as keyboards and to connect the wire $y^3$ of each pedal to the corresponding keyboard in order to obtain, when desired, throughout the entire length of each keyboard one of the desired effects. If the same distributers serve for all the keyboards, the wires extending from each pedal to the distributers V$^3$, W$^3$ may be connected in parallel, as indicated in Fig. 5$^a$.

The murmuring and tremolo effects are produced by the use in the common part of the circuit (in either the whole or part of the instrument) of an interrupted or broken current, the interruptions of which are completely independent of the vibrations of the string.

The tremolo effect is obtained by a rythmical interruption of the ordinary or of the murmuring sound in such manner as to resemble that secured by a violinist when the finger is rapidly oscillated on the string. This result is obtained by throwing into the common part of the circuit (in either the whole or part of the instrument) the current which is interrupted with slow and regular frequency. The number of interruptions per second is about five. The device for carrying it out may be of any suitable character; for example, a system of moving contact blocks, a trembler, or other device.

Figure 8:
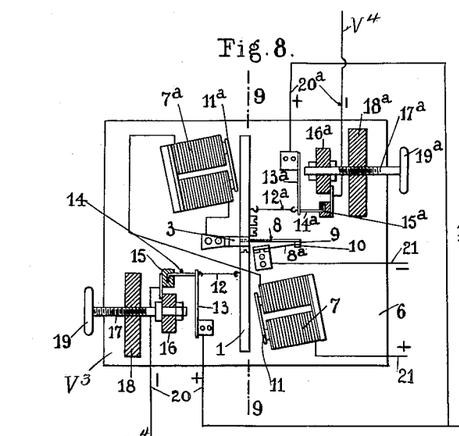
Fig. 8 is a plan view of the tremolo contact-breaker device.
Figure 9:
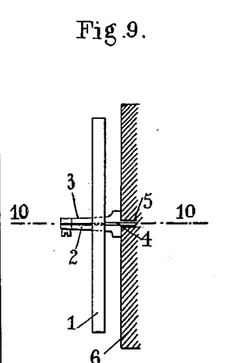
Fig. 9 is a section on the line 9—9, Fig. 8.
Figure 10:
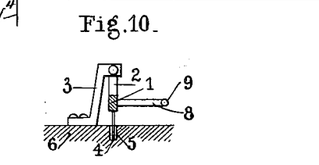
Fig. 10 is a section on the line 10—10, Fig. 9.

Fig. 8 represents, by way of example, an interrupter construction which gives good results by reason of its low inertia and the regularity of its movement. The apparatus comprises an iron pendulum or oscillator 1 mounted on a horizontal axis and suspended on a spring 2 from a support 3 and guided by a pin 4 loosely fitted in a hole 5 in the plate 6 on which the apparatus is mounted. The pendulum is subjected to the influence of two electromagnets 7 and 7$^a$ capable of imparting to it an oscillating motion. It carries at its center a spring 8 terminating in a contact piece 9 which presses upon another contact piece 10 carried by a flexible plate 8$^a$. The springs 8 and 8$^a$ are covered with rubber to suppress the noise produced by the contacts. Felt pads 11 and 11$^a$ prevent the pendulum 1 from making any noise by striking on the electromagnets 7 and 7$^a$. The movement of the pendulum is transmitted by wires 12, 12$^a$ to springs 13, 13$^a$, provided at their extremities with non-oxidizing contact pieces 14, 14$^a$. The contact pieces 14, 14$^a$ press against non-oxidizing plates 15, 15$^a$ and complete the circuit to the electro-magnet 49$^h$, which actuates the bell crank 49$^f$ and breaks the contacts 49 and 49$^e$ and permits the vibration of the strings. The plates are inclined so that the contact pieces rub upon them, thereby insuring an automatic cleaning of the contacts and regular working of the apparatus due to the resulting good connections. Each plate 15 or 15$^a$ is connected by a slide 16, 16$^a$ mounted upon the end of a screw threaded spindle 17, 17$^a$, which works through a wooden nut 18, 18$^a$ fixed upon the base plate 6. A controlling wheel 19, 19$^a$ affords means for adjusting the position of the plates 15, 15$^a$ to vary the duration of the connection between the contact pieces 14, 14ª and the corresponding plates 15, 15ª.

The electromagnets 7, 7ª and the contacts 9, 10 are mounted in series in a special circuit in such manner that the system works after the fashion of a bell trembler. One of the contacts 14, 15 is interposed in the common part of the circuit 20, corresponding to one-half keyboard of the instrument. The other contact 14ª, 15ª is inserted in the common part of the circuit 20ª of the other half keyboard. Resistances (not shown) are mounted in parallel with the contacts 14, 15 and 14ª, 15ª so as to reduce sparking. It is evident that each half keyboard may have its special interrupter, as shown in Fig. 5, or that the same pulsator may serve a plurality of manuals, as indicated in Fig. 5ª. The operation of the interrupter is readily understood. When the oscillating pendulum 1 swings under the action of the electromagnets 7, 7ª and the contacts 9, 10, the wires 12, 12ª respectively pull upon the contacts 14, 14ª, which are thus separated from the plates 15, 15ª, producing rhythmical interruptions in the common part of the circuit of each half of the keyboard (Figs. 5 and 8) or for each manual (Fig. 5ª).

The murmuring effect is produced by interrupting rapidly the current in the common part of the circuit in such manner that the frequency of the interruptions can never have the same frequency as the harmonic vibration of any string of the piano and can never blur with the notes by developing harmonic resonances. There are two ways of carrying this out: first, by interrupting the current in that part of the circuit which is common to all of the notes with a frequency much more rapid than that of the tremolo effect, but nevertheless slower than the vibrations of the slowest harmonic notes of the piano—for example, 30 to 50 interruptions per second. This frequency may be regular or irregular. The second method consists in interrupting the current in that part of the circuit which is common to all of the notes by a frequency more rapid than previously, but irregular. By reason of this irregular frequency, the pulsations, without blurring the notes, can be as rapid as the vibrations of the notes of the piano.

The interposition of a rheostat Z in that part of the circuit which is common to all of the notes, permits the intensity of the murmur to be regulated.

Figure 11:
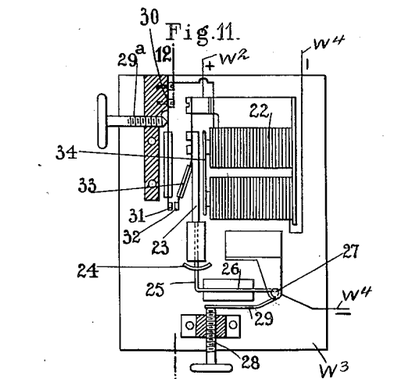
Fig. 11 is a plan view of the distributer by which a murmuring effect is obtained.
Figure 12:
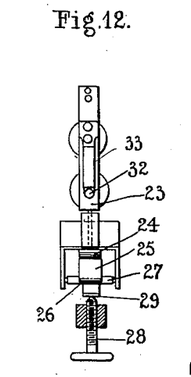
Fig. 12 is a section on the line 12—12, Fig. 11, seen from the left.

To secure the murmuring effect in accordance with the first method above mentioned, an interrupter of any kind may be utilized—for example, the tremolo-effect interrupter, provided its movement be accelerated. This method, however, has the disadvantage that it develops in the high notes a very pronounced staccato which is artistically acceptable only in the most pianissimo passages. In accordance with the second method, we may utilize either any suitable and well known form of apparatus producing a pulsating current, or current interrupting apparatus, such as interrupting distributers driven by a motor, or tremblers. It is sufficient to arrange irregularly the contacts of the motor. A trembler is shown in Figs. 5, 11, and 12, which is particularly convenient and possesses the advantage of responding quickly and of being practically proof against maladjustment, of cleaning the contact surfaces automatically, obviating the sticking of the contacts, and of making no noise. This apparatus comprises an electromagnet 22 acting in the manner of an ordinary trembler upon an armature 23 which carries at its extremity a non-oxidizing contact surface 24 of arched shape. Upon the surface 24 there presses edgewise a non-oxidizing plate 25 carried by an arm 26 mounted on a pivot 27. An adjusting screw 28, acting on the spring 29, mounted on the axis of the arm 26, allows of varying the pressure of the contact pieces 24, 25 and the duration of the breaks there produced. This may therefore be employed for the production of fortissimo or pianissimo. A second adjusting screw 29ª, acting on the spring 30, allows of regulating the contact 31, 32 of the trembler. The springs 30 and 33, as well as the rods which carry the contacts 24, 25, are covered with rubber to reduce the noise. A sheet of felt 34 is placed in front of the electromagnet 22 for the same purpose. Another sheet of felt is interposed between the support of the pivot 27 and the board which serves as base to reduce the resonances. In general, all resonances must be suppressed. A suitably padded box incloses the whole apparatus.

The electromagnet 22 and the contact 31, 32 are mounted in series in an auxiliary circuit in such a way that the system works like an electric bell trembler. There is produced between the contact pieces 24, 25 a continual quivering which produces very rapid and irregular breaks. It is preferable to have a separate apparatus for each half of the keyboard.

The murmuring appliance produces distant effects of extreme softness, and these may be reduced to silence. In proportion as the resistances in the common part of the circuit are diminished, the quivering of the strings increases and there comes a time when this quivering is sufficient to bring about the break of the individual contacts of the strings; from this time onward the murmuring sound is replaced by the ordinary playing. But the murmuring sound can always be employed alone and increased to a heavy forte; for this purpose it is sufficient to prevent the individual breaks of the strings either by suppressing the action of the parts producing the plucking of the individual contacts, or by increasing the pressure at these same contacts. The term tremolo is employed herein to designate not the tremolo of the "harmonium" which is not beautiful, but an expression effect which closely resembles the "voix humaine" of the "grand orgue", or the "voix celeste" of the "harmonium", and especially the expression of the "violiniste", and this difference from the tremolo of the "harmonium" is due to the inertia of the vibrating body.

We claim—

1. A musical instrument of the character described having in combination, a sounding body, an electromagnet for vibrating said body, means for exciting said magnet with pulsations of current having a frequency substantially the same as the normal frequency of vibration of said body, and a non-resonant fret spaced from the sounding body but impinged against by the latter when in heavy vibration.

2. A musical instrument of the character described having in combination, a sounding body, an electromagnet for vibrating said body, means for exciting said magnet with pulsations of current having a frequency substantially the same as the normal frequency of vibration of said body, and a non-resonant fret spaced from the sounding body but impinged against by the latter when in heavy vibration, said fret comprising a hard body faced with soft material.

3. A musical instrument of the character described having in combination, a sounding body, an electromagnet for vibrating said body, means for exciting said magnet with pulsations of current having a frequency substantially the same as the normal frequency of vibration of said body, and means for introducing into the magnet pulsations of current having a frequency different from the frequency of the harmonic vibrations of said sounding body.

4. A musical instrument of the character described having in combination, a plurality of sounding bodies, an electromagnet for each of said bodies, means for introducing into said magnets pulsations of current having the same frequencies as the normal vibration of the respective sounding bodies, an electric circuit having a part common to all of said electromagnets, and a pulsator in said common part of the circuit for introducing into the electromagnets pulsations of current having frequencies different from the frequencies of the harmonic vibrations of said sounding bodies.

5. A musical instrument of the character described having in combination, a plurality of sounding bodies, an electromagnet for each of said bodies, means for introducing into said magnets pulsations of current having the same frequencies as the normal vibration of the respective sounding bodies, an electric circuit having a part common to all of said electromagnets, and a pulsator in said common part of the circuit for introducing into the electromagnets pulsations of current having frequencies different from the frequencies of the harmonic vibrations of the sounding bodies, said pulsator comprising a pair of coöperating contacts one of which is fixed, together with an electric trembler having an armature carrying the other contact.

6. A musical instrument of the character described having in combination, a sounding body, an electromagnet for vibrating said body, means for exciting said magnet with pulsations of current having frequencies substantially the same as the normal frequencies of vibration of said body, and means for introducing into the magnet pulsations of current of a frequency less than the slowest harmonics of the sounding body.

7. In a musical instrument, a sounding body, an electromagnet for vibrating said body, means for exciting said magnet with pulsations of current having a frequency substantially the same as the normal frequency of vibration of said body, and means for introducing into the magnet slow and regular pulsations of a frequency of about five per second.

8. A musical instrument of the character described having in combination, a plurality of sounding bodies, an electromagnet for each of said sounding bodies, means for introducing into said electromagnets respective pulsations of current having the same frequencies as the normal vibration of the respective sounding bodies, an electric circuit having a part common to all of said electromagnets, and a pulsator in said common part for introducing into said electromagnets pulsations of current having frequencies lower than the frequencies of any of the harmonic vibrations of the several sounding bodies.

9. A musical instrument of the character described having in combination, a plurality of sounding bodies, an electromagnet for each of said bodies, means for introducing into said magnets pulsations of current having the same frequencies as the normal vibration of the respective sounding bodies, an electric circuit having a part common to all of said electromagnets, and a pulsator in said common part of the circuit for introducing into the electromagnets pulsations of current having frequencies different from the freqencies of the harmonic vibrations of said sounding bodies, said pulsator comprising a pair of coöperating contacts, an electric trembler having an armature carrying one of said contacts, the other contact being fixed but scraping against the first contact during the vibration of the trembler.

10. A musical instrument of the character described having in combination, a plurality of sounding bodies, an electromagnet for each of said bodies, means for introducing into said magnets pulsations of current having the same frequencies as the normal vibration of the respective sounding bodies, a non-resonant fret spaced from each of said bodies but impinged against when the latter are in heavy vibration, a circuit having a part common to all of said electromagnets, and a pulsator in said common part for introducing into said magnets pulsations having frequencies different from the harmonic vibrations of the sounding bodies.

11. A musical instrument of the character described having in combination, a plurality of sounding bodies, a plurality of keyboards, and for each sounding body an electromagnet, a circuit for each electromagnet and contacts in each electromagnet circuit controlled by a corresponding key, together with, for each keyboard, a part of said circuit being common to all of the keys of said keyboard, and means for introducing at will into said common part of the circuit predetermined pulsations of current.

12. A musical instrument of the character described having in combination, a plurality of sounding bodies, a plurality of keyboards, and for each sounding body an electromagnet, a circuit for each electromagnet and contacts in each electromagnet circuit controlled by a corresponding key, together with, for each keyboard, a part of said circuit being common to all of the keys of said keyboard, and means for introducing at will into said common part of the circuit predetermined pulsations of current but different for each keyboard.

13. A musical instrument of the character described having in combination, a plurality of sounding bodies, a plurality of keyboards, and for each sounding body an electromagnet, a circuit for each electromagnet and contacts in each electromagnet circuit controlled by a corresponding key, together with, for each keyboard, a part of said circuit which is common to all of the keys of said keyboard, and means for introducing at will into said common part of the circuit predetermined pulsations of current but different for each keyboard, and, for each keyboard, a sustaining pedal.

14. A musical instrument of the character described having in combination, a resonant string, means for vibrating the same, and a non-resonant fret comprising a hard body with soft facing spaced about three millimeters from the string but impinged against by the latter when widely vibrated, for the purpose specified, and arranged at a point about one quarter of the distance between the ends of the vibrating portion of the string.

15. A musical instrument of the character described having in combination, a resonant string, an electromagnet for vibrating the same, a non-resonant fret arranged on the opposite side of the string from the electromagnet at a point about one quarter the length of the vibrating portion of the string and at the opposite end thereof from the electromagnet, said fret being spaced from the string but impinged against by the latter when in wide vibration, for the purpose specified.

In testimony whereof we sign our names to this specification in the presence of two subscribing witnesses.

ALCIDE HECTOR MAÎTRE.
VICTOR HENRI GASTON MARTIN.

Witnesses:
 LOUIS CÔROUGE,
 LUCIEN MEMMINGER.